United States Patent

Hussain

[11] Patent Number: 6,067,068
[45] Date of Patent: May 23, 2000

[54] SCROLLABLE DISPLAY WINDOW

[75] Inventor: Arshad Hussain, Foothill Ranch, Calif.

[73] Assignee: Canon Business Machines, Inc., Costa Mesa, Calif.

[21] Appl. No.: 08/682,349

[22] Filed: Jul. 17, 1996

[51] Int. Cl.[7] .................................................. G09G 5/34
[52] U.S. Cl. ............................................ 345/123; 345/125
[58] Field of Search ................................... 345/123, 121, 345/122, 124, 125, 112, 341, 340, 509, 116, 145, 130, 508; 395/774; 364/518, 521

[56] References Cited

U.S. PATENT DOCUMENTS

| | | | |
|---|---|---|---|
| 4,642,794 | 2/1987 | Lavelle et al. | 345/123 |
| 4,794,386 | 12/1988 | Bedrij et al. | 345/123 |
| 4,903,013 | 2/1990 | Takeda | 345/123 |
| 5,053,761 | 10/1991 | Webster, III | 345/123 |
| 5,175,813 | 12/1992 | Golding et al. | 345/123 |
| 5,208,588 | 5/1993 | Nishiyama | 345/123 |
| 5,335,322 | 8/1994 | Mattison | 395/164 |
| 5,345,552 | 9/1994 | Brown | 345/123 |
| 5,381,347 | 1/1995 | Gery | 364/514 |
| 5,384,579 | 1/1995 | Nakasuji et al. | 345/123 |
| 5,454,076 | 9/1995 | Cain et al. | 395/164 |
| 5,502,808 | 3/1996 | Goddard et al. | 395/162 |
| 5,502,809 | 3/1996 | Takano | 395/164 |
| 5,623,588 | 4/1997 | Gould | 345/123 |
| 5,634,064 | 5/1997 | Warnock et al. | 395/774 |

OTHER PUBLICATIONS

Petzold, *Programming Windows : the Microsoft guide to writing applications for Windows 3.1*, 3rd ed., Microsoft Press, 1992, pp. 60–85.

Primary Examiner—Chanh Nguyen
Attorney, Agent, or Firm—Fitzpatrick, Cella Harper & Scinto

[57] ABSTRACT

A system to scroll a first image inside a window of a second image displayed on a display screen. The system includes storage of the second image in a VRAM, designation of display addresses in the VRAM corresponding to a location of the window on the display screen, storage of the first image in a memory different from the VRAM, definition of a pointer indicating a first portion of the image to be displayed in the window, and copying of the first portion of the first image from the memory to the VRAM at the display addresses based on the pointer. The system further includes display of the first portion of the first image in the window of the second image, acceptance of user interface commands to scroll the first image and changing the value of a pointer in response thereto, the changed value indicative of a second portion of the first image to be displayed in the window, and repetition of the copying step and the displaying step with respect to the second portion.

93 Claims, 7 Drawing Sheets

SCROLLABLE DISPLAY WINDOW

BACKGROUND OF THE INVENTION

1. Field of the Invention

The present invention relates to a system for displaying a stored image within a display window of an already-displayed image such that the stored image may be easily scrolled. More particularly, the present invention concerns an image scrolling system which scrolls a stored image in a display window by 1) retrieving a portion of the stored image from a memory, 2) copying the portion to a video random access memory (VRAM) area, 3) displaying the portion in a display window corresponding to the VRAM area and 4) repeating steps 1) to 3) in response to operator-generated scrolling instructions.

2. Description of the Related Art

Conventional display systems are capable of scrolling an image in a window of a display screen. However, these systems must perform several complex steps to effect such scrolling. For example, applications written for the Microsoft Windows operating system scroll an image in a window by first moving still-visible portions of the image to their new position in the window. Next, the operating system issues a "paint" command instructing the application to redraw invalidated regions so as to fill any empty space in the window. The empty space is redrawn with second portions of the image such that the image appears to scroll in the window. Due to the complexity of these required steps, any scrolling performed by these conventional display systems is both time-consuming and computing-intensive.

Accordingly, what is needed is a display system for scrolling an image in a display window which reduces both computing time and VRAM.

SUMMARY OF THE INVENTION

The present invention addresses the foregoing by providing a display system which scrolls an image stored in a memory by first drawing the scrollable image in a memory and then, in response to desired scrolling operations, simply transferring an appropriate portion of the image from the memory to VRAM.

Thus, according to one aspect of the invention, a first image is scrolled inside a window of a second image displayed on a display screen by storing the second image in a VRAM, designating an address in the VRAM corresponding to a location of the window on the display screen, storing contiguous image information corresponding to the first image in a memory different from the VRAM, defining a pointer corresponding to a portion of the contiguous image information of the first image, copying the portion of contiguous image information from the memory to the VRAM at the designated address in VRAM and displaying the contiguous image information in the window of the second image. User interface commands are accepted to scroll the first image, and in response to those user interface commands the value of the pointer is changed and the copying from memory and displaying are repeated.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
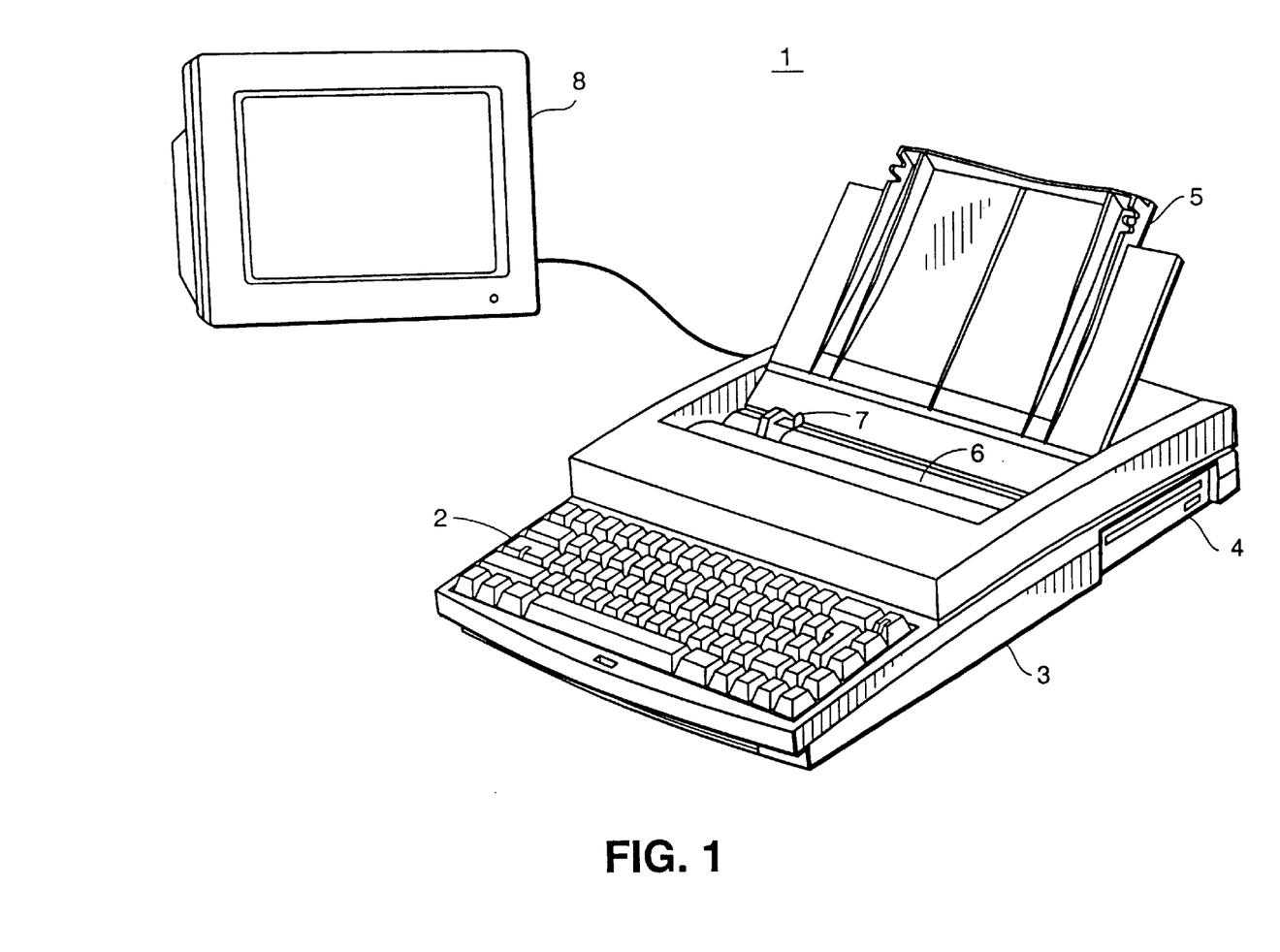
FIG. 1 is a view showing a preferred embodiment of the present invention.

FIG. 1 is a view showing the outward appearance of a representative embodiment of the invention. Shown in FIG. 1 is word-processing system 1 which includes keyboard 2, frame 3, floppy disk drive 4, paper support 5, paper advance roller 6, printing unit 7 and stand-alone display monitor 8.

In the preferred embodiment, word-processing system 1 is a Canon StarWriter Jet 4000, which employs inkjet printing technology and a 14-inch VGA monitor having a resolution of 640×480 pixels. Of course, the present invention may be embodied in any system for displaying images.

A user of a word-processing system embodying the present invention uses keyboard 2 to input characters into system 1. These characters may be displayed on display monitor 8, output onto a page via paper support 5, paper advance roller 6 and printing unit 7, or saved to a floppy disk inserted in floppy disk drive 4 for later editing, printing or display. Characters may also be input into system 1 through a floppy disk inserted in floppy disk drive 4.

Figure 2:
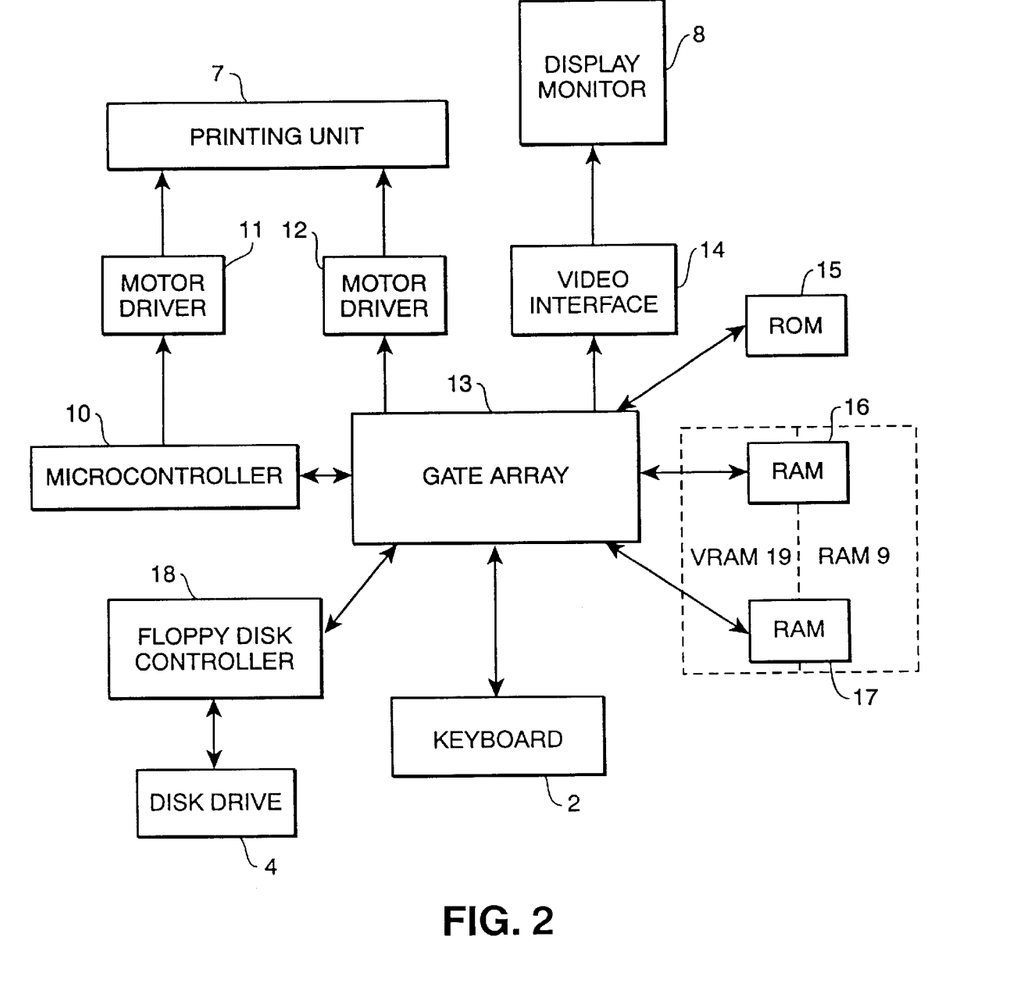
FIG. 2 is a block diagram showing the internal functional arrangement of the embodiment of FIG. 1.

The internal operation of word-processing system 1 is diagrammed in FIG. 2. As shown in the Figure, word-processing system 1 is controlled by microcontroller 10, which interfaces to motor driver 11 and gate array 13. Motor driver 11, in turn, interfaces to printing unit 7 in order to provide control over printing unit 7. Second motor driver 12 interfaces to printing unit 7 to provide a second means for controlling printing unit 7 and also interfaces to gate array 13. Similarly, gate array 13 interfaces to video interface 14, which controls display monitor 8.

Gate array 13 is also connected to sixteen megabyte read-only memory (ROM) 15, which provides a majority of the instructions necessary to operate system 1, and to one megabyte random access memory (RAM) 16 and one megabyte RAM 17. RAMs 16 and 17 contain the system's standard random access memory (RAM) 9 and video random access memory (VRAM) 19. It should be noted that any data stored in VRAM 19 is displayed on display monitor 8 each time monitor 8 is refreshed.

Alternatively, VRAM 19 may be included separately from RAM 9. For example, VRAM 19 may be included within interface 14 so that data within VRAM 19 can be accessed by interface 14 without needing to travel through gate array 13.

Keyboard 2 is connected to gate array 13 and thereby allows a user to input commands and/or text into system 1 so as to perform word-processing tasks. Floppy disk controller 18, also connected to gate array 13, controls floppy disk drive 4 in order to obtain data from or save data to a floppy disk. For example, floppy disk controller 18 can be used to transfer a software application embodying the present invention from floppy disk drive 4 to RAM 9.

Figure 3:
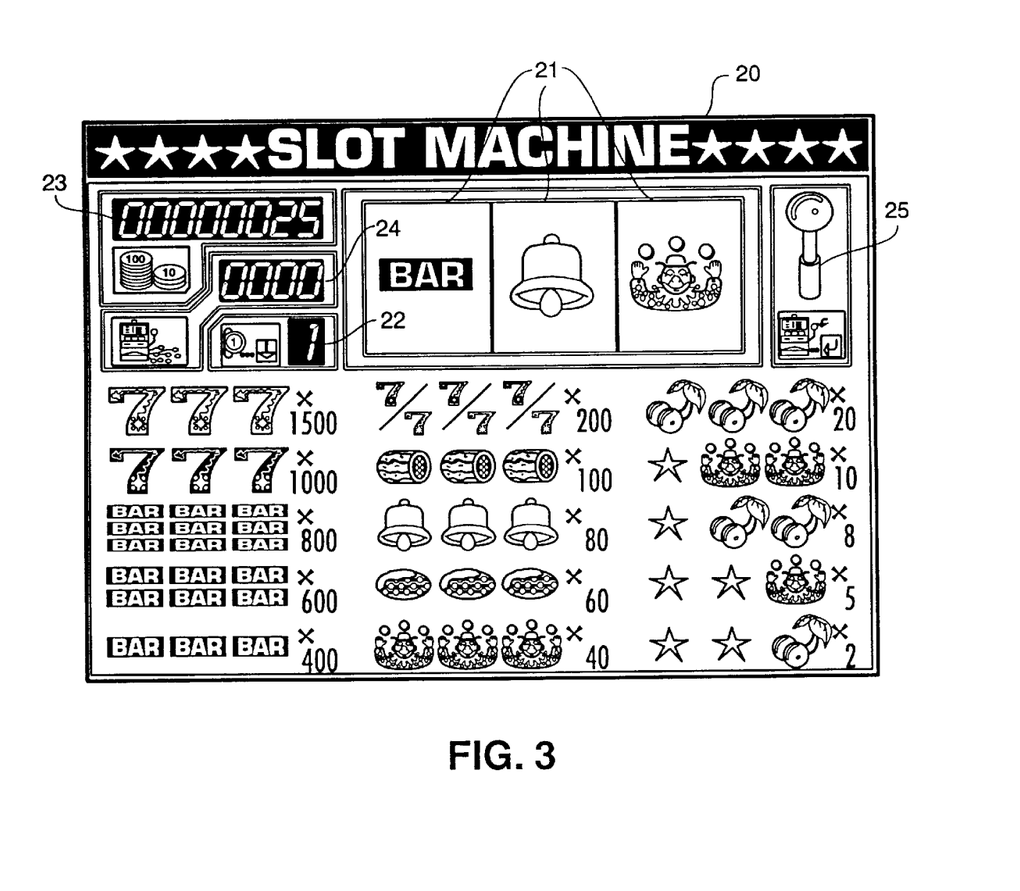
FIG. 3 is a view of a display screen of a software application embodying the present invention.

A representative display of a "slot machine" software application embodying the present invention is shown FIG. 3. The display shows background image 20 having three display windows 21 in which images are scrolled. Background image 20 also provides the user with information windows relating to game play, such as amount wagered window 22, total winnings window 23 and amount earned per trial window 24. Background image 20 also contains a slot machine handle 25 which is graphically "pulled" when activated by a user. Once handle 25 is pulled, a scrolling method according to the present invention is invoked.

Figure 4A:
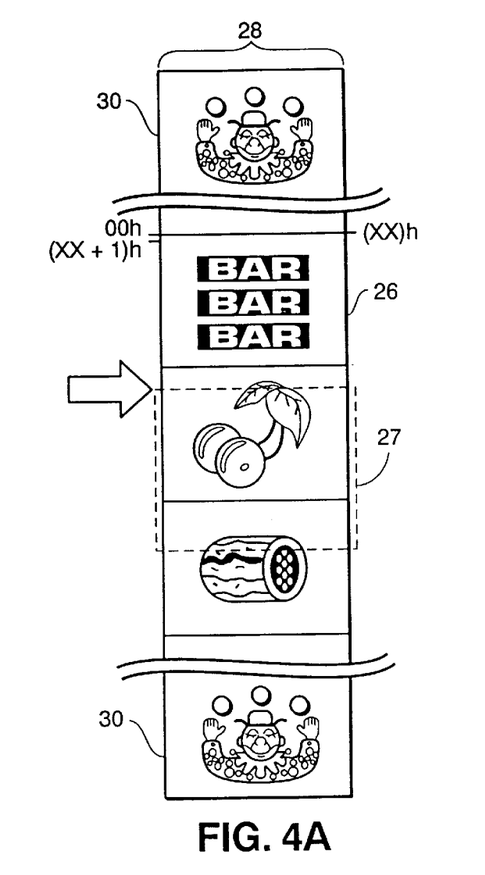
FIGS. 4A and 4B are views of an image to be scrolled as stored in a memory according to the present invention.
Figure 4B:
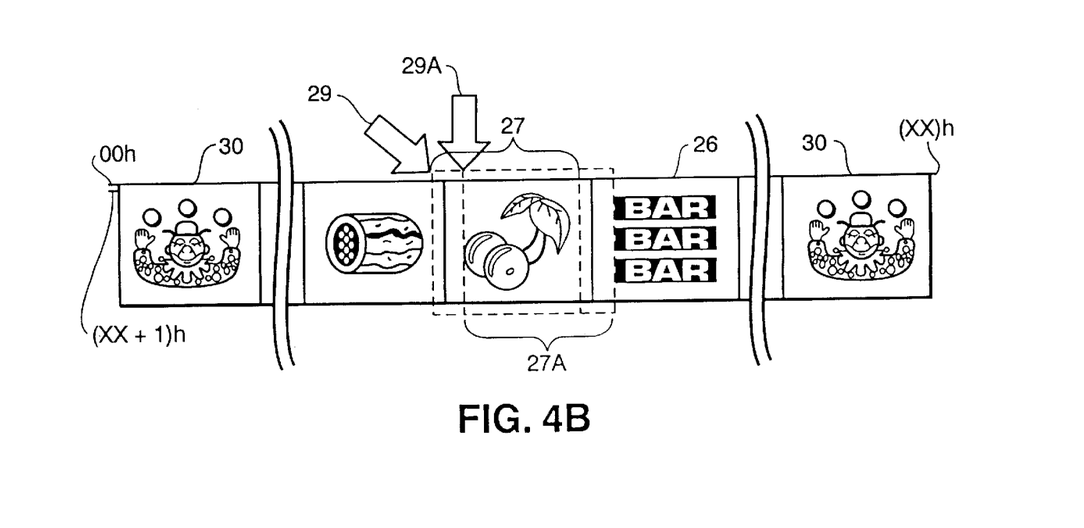

FIGS. 4A and 4B show two versions of image 26, which is to be scrolled in display windows 21. Image 26 is stored as contiguous image information in RAM 9. While it is preferable to store the image information in RAM 9, so that image contents can be changed, image information may also be stored in ROM 15 when practicing the invention. It should be noted that image 26 is stored such that the first and last stored "frames" 30 of image 26 are identical.

FIG. 4A also shows pointer 29, which defines view box 27. View box 27 circumscribes a portion of contiguous image information of image 26 which is displayed in display window 21. Therefore, pointer 29 corresponds to the portion of contiguous image information of image 26 which is displayed in display window 21. In addition, view box width 28 is equal to the width of image 26.

Image 26 is stored within RAM 9 so as to facilitate manipulation of pointer 29 during the scrolling process, which will be described with respect to FIG. 7. For example, in the case that vertical scrolling is desired, image 26 is stored as a "vertical" data structure, as shown in FIG. 4A, in which the address of a first pixel of a row immediately follows the address of the last pixel of the preceding row.

FIG. 4B shows stored image 26 in the case that horizontal scrolling is desired. In particular, the rows of each scrolled "frame" of image 26 are addressed sequentially, with the last address of a row of the last "frame" immediately preceding the first address of the next row of the first "frame". FIG. 4B also shows pointers 29 and 29A, which respectively point to view box 27 and view box 27A.

Figure 5:
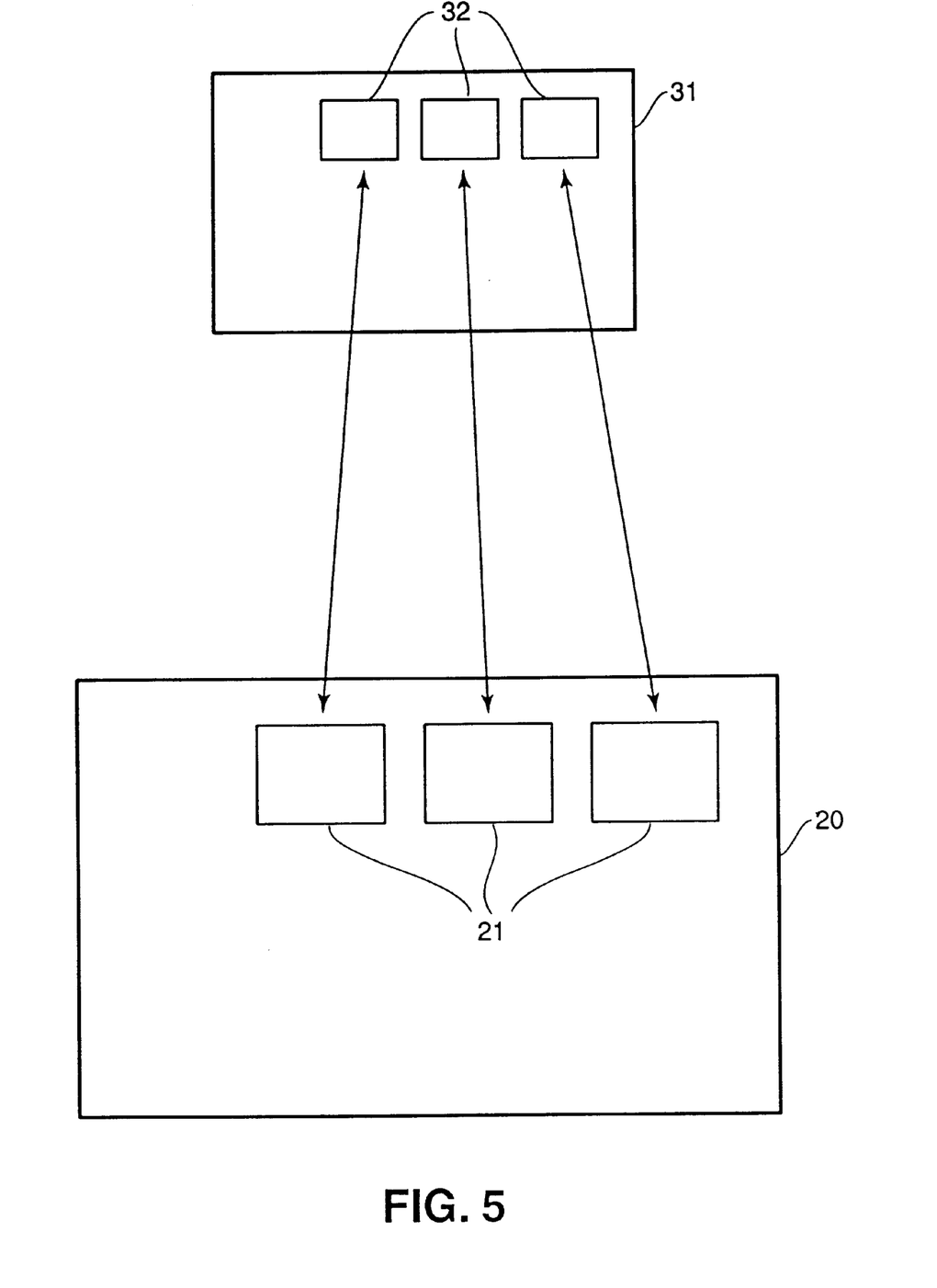
FIG. 5 is a view for describing a correspondence between VRAM memory areas and display monitor pixel positions according to the present invention.

FIG. 5 depicts VRAM memory map 31, in correspondence with display 20. In the present invention, monitor 8 is a black-and-white monitor. Accordingly, only one bit is needed to store the ON/OFF state of each pixel of monitor 8. Accordingly, each bit stored in VRAM 19 corresponds to a pixel on display monitor 8. If a bit in VRAM 19 is set high, the corresponding pixel on monitor 8 is activated. As shown in FIG. 5, VRAM 19 contains memory addresses 32 corresponding to each display window 21 of background image 20. Therefore, any data written to an address located within one of memory addresses 32 appears at a corresponding position in corresponding display window 21. Of course, other VRAM-to-monitor memory maps may be used, such as 24-bits of VRAM for each monitor pixel in a case where 24-bit color is in use.

Figure 6A:
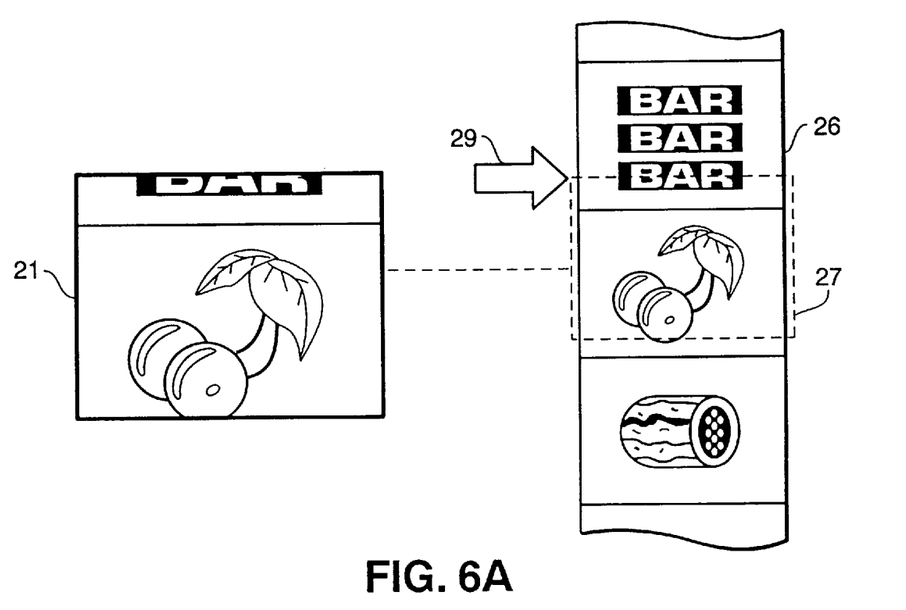
FIGS. 6A and 6B are two views of a display window and a corresponding view box during scrolling according to the present invention.
Figure 6B:
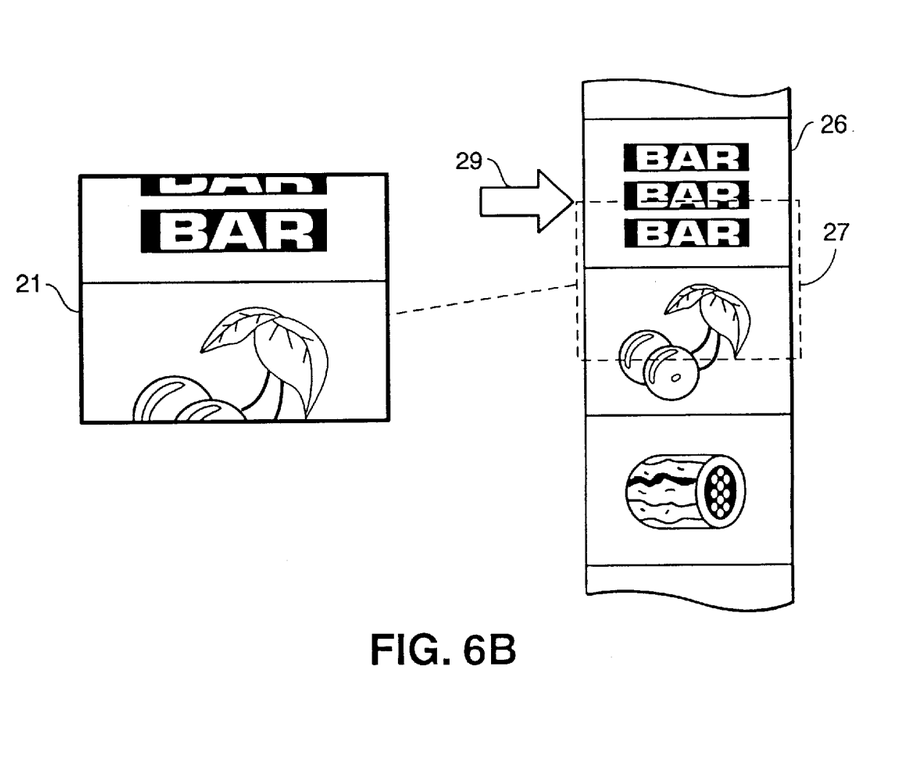

FIG. 6A is a view of one of display windows 21 and image 26 during a scrolling method according to the present invention. Pointer 29 points to view box 27, which circumscribes a portion of contiguous image information of image 26. During scrolling, the contiguous information circumscribed by view box 27 is transferred to one of VRAM memory addresses 32. Accordingly, the portion of image 26 circumscribed by view box 27 of FIG. 6A is shown in display window 21. FIG. 6B shows a similar view, except that view box 27 and display window 21 contain a different portion of image 26 than that shown in FIG. 6A.

Figure 7:
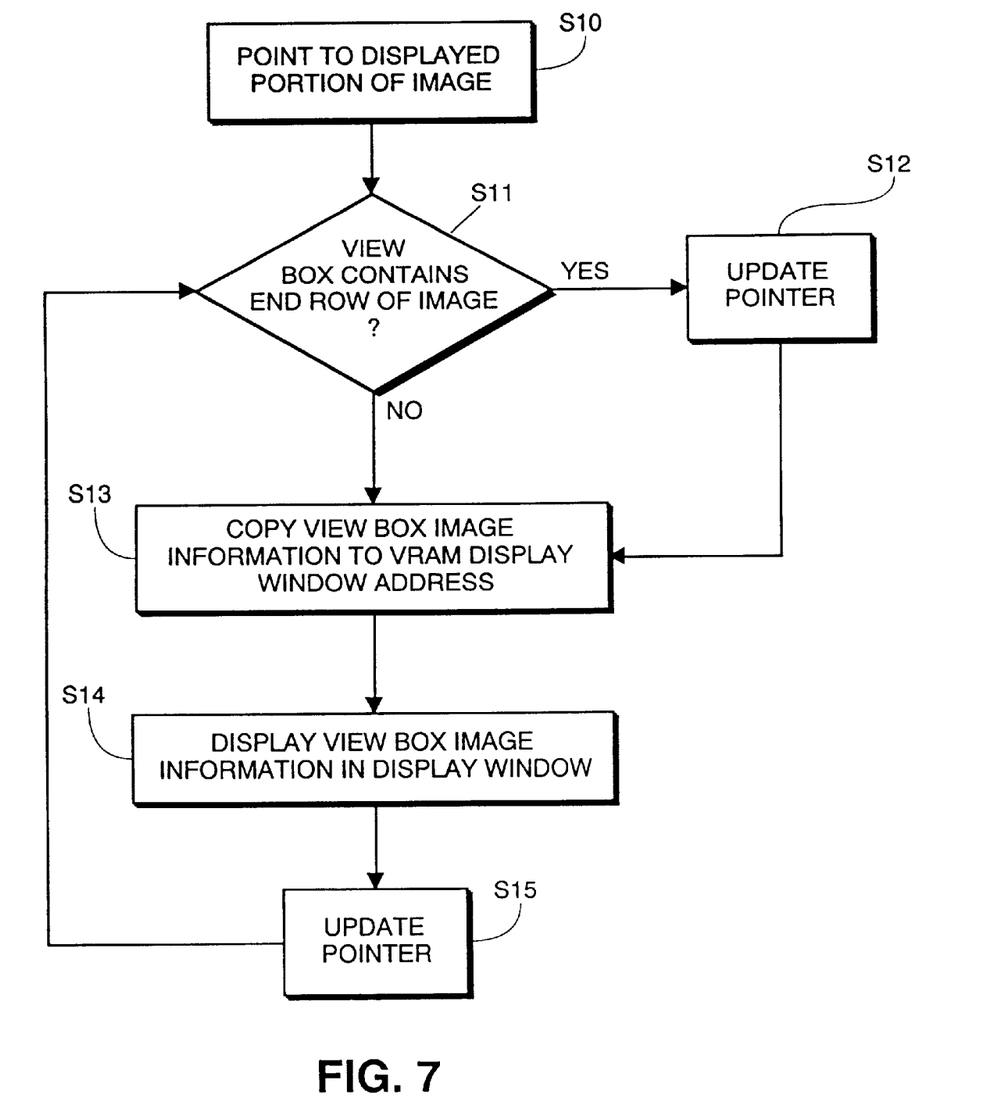
FIG. 7 is a flowchart for describing a method for scrolling image data in a display window according to the present invention.

FIG. 7 is a flowchart illustrating the method of the present invention. In response to user interaction which causes a simulated pull of handle 25, the method of the present invention begins scrolling image 26 within display windows 21. However, for the sake of clarity, the method of the present invention will be described with respect to scrolling image 26 in one of display windows 21.

In this regard, pointer 29 initially points to a currently displayed portion of image 26 in step S10. As shown in FIG. 4A, this portion of image 26 is circumscribed by view box 27 and begins at a leftmost edge of image 26.

Next, in step S1, view box 27 is examined to determine whether it has reached an end row of image 26. For example, if downward scrolling is being performed, view box 27 is examined to determine whether it contains the first row of image 26. If so, pointer 29 has reached the top of image 26 and pointer 29 must be updated in step S12 to continue scrolling. If not, flow proceeds to step S13.

In step S12, pointer 29 is updated so as to point to the first row of the last "frame" 30 of image 26. Since first and last "frames" 30 of image 26 are identical, view box 27 circumscribes identical contiguous portions of image 26 before and after step S12. This method insures that image 26 scrolls smoothly in display window 21. Flow then proceeds to step S13.

As an alternative to steps S11 and S12, pointer 29 may define view box 27 such that view box 27 circumscribes several rows of image 26 at both the top and bottom of the "vertical" data structure of image 26. This "wrap-around" feature enables the present invention to scroll image 26 without performing steps S11 and S12. In addition, this alternative does not require first and last "frames" 30 to be identical.

Returning to the flow at step S13, the portion of image 26 within view box 27 is copied to VRAM address 32 which corresponds to display window 21 in which image 26 is to be scrolled. Accordingly, the portion of image 26 within view box 27 is the same size as VRAM area 32.

As mentioned above, any data present in VRAM 19 is displayed on display monitor 8 each time monitor 8 is refreshed. Therefore, in step S14, the portion of image 26 copied to VRAM 19 in step S13 is displayed in display window 21.

In step S15, pointer 29 is updated in accordance with the desired scrolling effect. For example, to scroll downward, pointer 29 is decremented by a value equal to view box width 28. As a result, the portion of image 26 within view box 27 loses its lowest line and gains a new uppermost line. Therefore, once the updated portion of image 26 stored in view box 27 is displayed in step S14, the previously displayed portion appears to have scrolled downward. Flow continues in this manner, resulting in the desired downward scrolling effect.

Similarly, in order for image 26 to scroll upward, the address pointer is incremented by the width of view box 27 in step S15. Either downward or upward scrolling can be accelerated by decrementing or incrementing pointer 29 by an integer multiple of view box width 28.

Manipulation of pointer 29 during downward scrolling is illustrated in FIGS. 6A and 6B. These Figures show display window 21 and view box 27 at two different moments during downward scrolling. In FIG. 6A, a portion of contiguous image information within view box 27 is displayed in display window 21. In FIG. 6B, pointer 29 has been decremented by an integer multiple of view box width 28. As a result, the portion of image 26 within view box 27 loses several of its lower lines and gains an identical amount of upper lines. Accordingly, in FIG. 6B, the displayed portion of image 26 shown in FIG. 6A has scrolled downward.

Pointer 29 can also be updated in step S15 so as to cause rightward horizontal scrolling. In this case, pointer 29 is incremented by one. Similarly, pointer 29 is decreased by one if leftward scrolling is desired. As described above with respect to vertical scrolling, horizontal scrolling can be accelerated by incrementing or decrementing pointer 29 by an integer multiple of one.

For example, image 26 is stored as shown in FIG. 4B in the case of horizontal scrolling. To perform rightward scrolling, pointer 29 of FIG. 4B is increased by a multiple of one, resulting in view box 27A. Rightward scrolling is accomplished by displaying the contents of view box 27A after displaying the contents of view box 27.

As mentioned above, in the preferred embodiment, the method described above is followed so as to scroll image 26 in each of display windows 21. However, view boxes corresponding to each display window 21 are initially defined at different locations within image 26 pattern and are updated at different increments, thereby causing unique scrolling within each of display windows 21.

While the present invention is described above with respect to what is currently considered to be the preferred embodiment, it is to be understood that the invention is not limited to the disclosed embodiment. To the contrary, the invention is intended to cover various modifications and equivalent structures included within the spirit and scope of the appended claims.

What is claimed is:

1. A method for scrolling a first image inside a window of a second image displayed on a display screen comprising the steps of:

storing the second image in a VRAM;

designating display addresses in the VRAM corresponding to a location of the window on the display screen;

storing the first image in a memory different from the VRAM;

defining a pointer indicating a first portion of the first image to be displayed in the window;

copying the first portion of the first image from the memory to the VRAM at the display addresses in the VRAM based on the pointer;

displaying the first portion of the first image in the window of the second image;

accepting user interface commands to scroll the first image and changing a value of the pointer in response thereto, the changed value indicating a second portion of the first image to be displayed in the window; and repeating said copying step and said displaying step with respect to the second portion.

2. A method according to claim 1, wherein said first and second portions of the first image have a height of x pixels and a width of y pixels and wherein said accepting step comprises accepting user interface commands to scroll the first image downward.

3. A method according to claim 2, wherein said accepting step further comprises decreasing the value of the pointer by y.

4. A method according to claim 2, wherein said accepting step further comprises decreasing the value of the pointer by an integer multiple of y.

5. A method according to claim 1, wherein said first and second portions of the first image have a height of x pixels and a width of y pixels and wherein said accepting step comprises accepting user interface commands to scroll the first image upward.

6. A method according to claim 5, wherein said accepting step further comprises increasing the value of the pointer by y.

7. A method according to claim 5, wherein said accepting step further comprises increasing the value of the pointer by an integer multiple of y.

8. A method according to claim 1, wherein the first image is stored horizontally, and wherein said accepting step comprises accepting user interface commands to scroll the first image rightward.

9. A method according to claim 8, wherein said accepting step further comprises increasing the value of the pointer by one.

10. A method according to claim 8, wherein said accepting step further comprises increasing the value of the pointer by an integer.

11. A method according to claim 1, wherein the first image is stored horizontally, and wherein said accepting step comprises accepting user interface commands to scroll the first image leftward.

12. A method according to claim 11, wherein said accepting step further comprises decreasing the value of the pointer by one.

13. A method according to claim 11, wherein said accepting step further comprises decreasing the value of the pointer by an integer.

14. A method according to claim 1, wherein the display addresses in the VRAM are mapped to the location of the window on the display screen.

15. A method according to claim 1, wherein, when a value of the pointer reaches a predetermined value, the pointer is reset to an initial value.

16. A method according to claim 1, wherein a size of said second image is n (n is an integer) times a size of said first image.

17. An apparatus for scrolling a first image inside a window of a second image displayed on a display screen, said apparatus comprising:

a memory for storing program instruction sequences; and a processor for executing the program instruction sequences stored in the memory, wherein said program instruction sequences include (a) a storing step for storing the second image in a VRAM, (b) a designating step for designating display addresses in the VRAM corresponding to a location of the window on the display screen, (c) a storing step for storing the first image in a memory different from the VRAM, (d) a defining step for defining a pointer indicating a first portion of the first image to be displayed in the window, (e) a copying step for copying the first portion of the first image from the memory to the VRAM at the display addresses in the VRAM based on the pointer, (f) a displaying step for displaying the first portion of the first image in the window of the second image, (g) an accepting step for accepting user interface commands to scroll the first image and changing a value of the pointer in response thereto, the changed value indicating a second portion of the first image to be displayed in the window, and (h) a repeating step for repeating said copying step and said displaying step with respect to the second portion.

18. An apparatus according to claim 17, wherein said first and second portions of the first image have a height of x pixels and a width of y pixels and wherein said accepting step comprises accepting user interface commands to scroll the first image downward.

19. An apparatus according to claim 18, wherein said accepting step further comprises decreasing the value of the pointer by y.

20. An apparatus according to claim 18, wherein said accepting step further comprises decreasing the value of the pointer by an integer multiple of y.

21. An apparatus according to claim 17, wherein said first and second portions of the first image have a height of x pixels and a width of y pixels and wherein said accepting step comprises accepting user interface commands to scroll the first image upward.

22. An apparatus according to claim 21, wherein said accepting step further comprises increasing the value of the pointer by y.

23. An apparatus according to claim 21, wherein said accepting step further comprises increasing the value of the pointer by an integer multiple of y.

24. An apparatus according to claim 17, wherein the first image is stored horizontally, and wherein said accepting step comprises accepting user interface commands to scroll the first image rightward.

25. An apparatus according to claim 24, wherein said accepting step further comprises increasing the value of the pointer by one.

26. An apparatus according to claim 24, wherein said accepting step further comprises increasing the value of the pointer by an integer.

27. An apparatus according to claim 17, wherein the first image is stored horizontally, and wherein said accepting step comprises accepting user interface commands to scroll the first image leftward.

28. An apparatus according to claim 27, wherein said accepting step further comprises decreasing the value of the pointer by one.

29. An apparatus according to claim 27, wherein said accepting step further comprises decreasing the value of the pointer by an integer.

30. An apparatus according to claim 17, wherein the display addresses in the VRAM are mapped to the location of the window on the display screen.

31. An apparatus according to claim 17, wherein, when a value of the pointer reaches a predetermined value, the pointer is reset to an initial value.

32. An apparatus according to claim 17, wherein a size of said second image is n (n is an integer) times a size of said first image.

33. Computer executable process steps stored on a computer-readable medium, the process steps for scrolling a first image inside a window of a second image displayed on a display screen, comprising:

a storing step to store the second image in a VRAM;

a designating step to designate display addresses in the VRAM corresponding to a location of the window on the display screen;

a storing step to store the first image in a memory different from the VRAM;

a defining step to define a pointer indicating a portion of the first image to be displayed in the window;

a copying step to copy the first portion of the first image from the memory to the VRAM at the display addresses in the VRAM based on the pointer;

a displaying step to display the first portion of the first image in the window of the second image;

an accepting step to accept user interface commands to scroll the first image and changing a value of the pointer in response thereto, the changed value indicating a second portion of the first image to be displayed in the window; and a repeating step to repeat said copying step and said displaying step with respect to the second portion.

34. Computer executable process steps according to claim 33, wherein said first and second portions of the first image have a height of x pixels and a width of y pixels and wherein said accepting step comprises accepting user interface commands to scroll the first image downward.

35. Computer executable process steps according to claim 34, wherein said accepting step further comprises decreasing the value of the pointer by y.

36. Computer executable process steps according to claim 34, wherein said accepting step further comprises decreasing the value of the pointer by an integer multiple of y.

37. Computer executable process steps according to claim 33, wherein said first and second portions of the first image have a height of x pixels and a width of y pixels and wherein said accepting step comprises accepting user interface commands to scroll the first image upward.

38. Computer executable process steps according to claim 37, wherein said accepting step further comprises increasing the value of the pointer by y.

39. Computer executable process steps according to claim 37, wherein said accepting step further comprises increasing the value of the pointer by an integer multiple of y.

40. Computer executable process steps according to claim 33, wherein the first image is stored horizontally, and wherein said accepting step comprises accepting user interface commands to scroll the first image rightward.

41. Computer executable process steps according to claim 40, wherein said accepting step further comprises increasing the value of the pointer by one.

42. Computer executable process steps according to claim 40, wherein said accepting step further comprises increasing the value of the pointer by an integer.

43. Computer executable process steps according to claim 33, wherein the first image is stored horizontally, and wherein said accepting step comprises accepting user interface commands to scroll the first image leftward.

44. Computer executable process steps according to claim 43, wherein said accepting step further comprises decreasing the value of the pointer by one.

45. Computer executable process steps according to claim 43, wherein said accepting step further comprises decreasing the value of the pointer by an integer.

46. Computer executable process steps according to claim 33, wherein the display addresses in the VRAM are mapped to the location of the window on the display screen.

47. Computer-executable process steps according to claim 33, wherein, when a value of the pointer reaches a predetermined value, the pointer is reset to an initial value.

48. Computer-executable process steps according to claim 33, wherein a size of said second image is n (n is an integer) times a size of said first image.

49. A method for scrolling a first image and a second image inside a window of a third image displayed on a display screen comprising the steps of:

storing the third image in a first memory used for storing images to be displayed on the display screen;

designating first display addresses and second display addresses in the first memory corresponding to a location of the window on the display screen;

storing the first image in a second memory, the second memory being different from the first memory;

storing the second image in a third memory, the third memory being different from the first memory;

defining a first pointer indicating a first portion of the first image to be displayed in the window;

defining a second pointer indicating a first portion of the second image to be displayed in the window;

copying the first portion of the first image from the second memory to the first memory at the first display addresses based on the first pointer;

copying the first portion of the second image from the third memory to the first memory at the second display addresses based on the second pointer;

displaying the first portion of the first image and the first portion of the second image in the window of the third image;

accepting user interface commands to scroll the first image, the second image, or both images, and changing a value of the first pointer, a value of the second pointer, or both values in response thereto, the changed value or values indicating a second portion of the first image to be displayed in the window, a second portion of the second image to be displayed in the window, or both; and repeating said copying step and said displaying step with respect to the portion or portions indicated by the changed value or values.

50. A method according to claim 49, wherein the first and second portions of the first and second images have a height of x pixels and a width of y pixels and wherein said accepting step comprises accepting user interface commands to scroll the first image, the second image, or both images downward.

51. A method according to claim 50, wherein said accepting step further comprises decreasing the value of the first pointer, the second pointer, or both pointers by y.

52. A method according to claim 50, wherein said accepting step further comprises decreasing the value of the first pointer, the second pointer, or both pointers by an integer multiple of y.

53. A method according to claim 50, wherein said accepting step further comprises increasing the value of the first pointer, the second pointer, or both pointers by y.

54. A method according to claim 50, wherein said accepting step further comprises increasing the value of the first pointer, the second pointer, or both pointers by an integer multiple of y.

55. A method according to claim 49, wherein the first and second portions of the first and second images have a height of x pixels and a width of y pixels and wherein said accepting step comprises accepting user interface commands to scroll the first image, the second image, or both images upward.

56. A method according to claim 49, wherein the first image and the second image are stored horizontally, and wherein said accepting step comprises accepting user interface commands to scroll the first image, the second image, or both images rightward.

57. A method according to claim 56, wherein said accepting step further comprises increasing the value of the first pointer, the second pointer, or both pointers by one.

58. A method according to claim 56, wherein said accepting step further comprises increasing the value of the first pointer, the second pointer, or both pointers by an integer.

59. A method according to claim 49, wherein the first image and the second image are stored horizontally, and wherein said accepting step comprises accepting user interface commands to scroll the first image, the second image, or both images leftward.

60. A method according to claim 59, wherein said accepting step further comprises decreasing the value of the first pointer, the second pointer, or both pointers by one.

61. A method according to claim 59, wherein said accepting step further comprises decreasing the value of the first pointer, the second pointer, or both pointers by an integer.

62. A method for scrolling a first image inside a window of a second image displayed on a display screen comprising the steps of:

storing the second image in a first memory used for displaying images on the display screen;

designating display addresses in the first memory corresponding to a location of the window on the display screen;

storing the first image in a second memory different from the first memory;

defining a pointer indicating a first portion of the first image to be displayed in the window;

copying the first portion of the first image from the second memory to the first memory at the display addresses based on the pointer;

displaying the first portion of the first image in the window of the second image;

accepting user interface commands to scroll the first image and changing a value of the pointer in response thereto, the changed value indicating a second portion of the first image to be displayed in the window; and repeating said copying step and said displaying step with respect to the second portion.

63. A method according to claim 62, wherein, in said designating step, first display addresses and second display addresses in the first memory corresponding to a location of the window on the display screen are designated, wherein, in said storing step, the first image and a third image are stored in the second memory, wherein, in said defining step, a first pointer indicating a first portion of the first image to be displayed in the window and a second pointer indicating a first portion of the third image to be displayed in the window are defined, wherein, in said copying step, the first portion of the first image is copied from the second memory to the first memory at the first display addresses based on the first pointer and the first portion of the third image is copied from the second memory to the first memory at the second display addresses based on the second pointer, wherein, in said displaying step, the first portion of the first image and the first portion of the third image are displayed in the window of the second image, and wherein, in said accepting step, user interface commands to scroll the first image, the third image, or both are accepted and a value of the first pointer, a value of the second pointer, or both is changed in response thereto.

64. An apparatus for scrolling a first image and a second image inside a window of a third image displayed on a display screen, comprising:

a first memory for storing the third image, the first memory for storing images to be displayed on the display screen;

designation means for designating first display addresses and second display addresses in the first memory corresponding to a location of the window on the display screen;

a second memory for storing the first image, the second memory being different from the first memory;

a third memory for storing the second image, the third memory being different from the first memory;

defining means for defining a first pointer indicating a first portion of the first image to be displayed in the window;

defining means for defining a second pointer indicating a first portion of the second image to be displayed in the window;

copying means for copying the first portion of the first image from the second memory to the first memory at the first display addresses based on the first pointer;

copying means for copying the first portion of the second image from the third memory to the first memory at the second display addresses based on the second pointer;

display means for displaying the first portion of the first image and the first portion of the second image in the window of the third image; and accepting means for accepting user interface commands to scroll the first image, the second image, or both images, and for changing a value of the first pointer, a value of the second pointer, or both values in response thereto, the changed value or values indicating a second portion of the first image to be displayed in the window, a second portion of the second image to be displayed in the window, or both, wherein said copying and said displaying are repeated with respect to the portion or portions indicated by the changed value or values.

65. An apparatus according to claim 64, wherein the first and second portions of the first and second images have a height of x pixels and a width of y pixels and wherein said accepting means accepts user interface commands to scroll the first image, the second image, or both images downward.

66. An apparatus according to claim 65, wherein said accepting means decreases the value of the first pointer, the second pointer, or both pointers by y.

67. An apparatus according to claim 65, wherein said accepting means decreases the value of the first pointer, the second pointer, or both pointers by an integer multiple of y.

68. An apparatus according to claim 65, wherein said accepting means increases the value of the first pointer, the second pointer, or both pointers by y.

69. An apparatus according to claim 65, wherein said accepting means increases the value of the first pointer, the second pointer, or both pointers by an integer multiple of y.

70. An apparatus according to claim 64, wherein the first and second portions of the first and second images have a height of x pixels and a width of y pixels and wherein said accepting means accepts user interface commands to scroll the first image, the second image, or both images upward.

71. An apparatus according to claim 64, wherein the first image and the second image are stored horizontally, and wherein said accepting means accepts user interface commands to scroll the first image, the second image, or both images rightward.

72. An apparatus according to claim 71, wherein said accepting means increases the value of the first pointer, the second pointer, or both pointers by one.

73. An apparatus according to claim 71, wherein said accepting means increases the value of the first pointer, the second pointer, or both pointers by an integer.

74. An apparatus according to claim 64, wherein the first image and the second image are stored horizontally, and wherein said accepting means accepts user interface commands to scroll the first image, the second image, or both images leftward.

75. An apparatus according to claim 74, wherein said accepting means decreases the value of the first pointer, the second pointer, or both pointers by one.

76. An apparatus according to claim 74, wherein said accepting means decreases the value of the first pointer, the second pointer, or both pointers by an integer.

77. An apparatus for scrolling a first image inside a window of a second image displayed on a display screen, comprising:

a first memory for storing the second image, the first memory used for displaying images on the display screen;

designation means for designating display addresses in the first memory corresponding to a location of the window on the display screen;

a second memory for storing the first image, the second memory different from the first memory;

defining means for defining a pointer indicating a first portion of the first image to be displayed in the window;

copying means for copying the first portion of the first image from the second memory to the first memory at the display addresses on the basis of the pointer;

display means for displaying the first portion of the first image in the window of the second image; and accepting means for accepting user interface commands to scroll the first image and for changing a value of the pointer in response thereto, the changed value indicating a second portion of the first image to be displayed in the window, wherein said copying and said displaying are repeated with respect to the second portion.

78. An apparatus according to claim 77, wherein said designating means designates first display addresses and second display addresses in the first memory corresponding to a location of the window on the display screen area in the first memory, wherein said storing means stores the first image and image a third image in the second memory, wherein said defining means defines a first pointer indicating a first portion of the first image to be displayed in the window and a second pointer indicating a first portion of the third image to be displayed in the window, wherein said copying means copies the first portion of the first image from the second memory to the first memory at the first display addresses based on the first pointer and copies the first portion of the third image from the second memory to the first memory at the second display addresses based on the second pointer, wherein said displaying means displays the first portion of the first image and the first portion of the third image in the window of the second image, and wherein said accepting means accepts user interface commands to scroll the first image, the third image, or both and changes a value of the first pointer, a value of the second pointer, or both in response thereto.

79. Computer executable process steps stored on a computer-readable medium, the steps to scroll a first image and a second image inside a window of a third image displayed on a display screen, the steps comprising:

a storing step to store the third image in a first memory used for storing images to be displayed on the display screen;

a designating step to designate first display addresses and second display addresses in the first memory corresponding to a location of the window on the display screen;

a storing step to store the first image in a second memory, the second memory being different from the first memory;

a storing step to store the second image in a third memory, the third memory being different from the first memory;

a defining step to define a first pointer indicating a first portion of the first image to be displayed in the window;

a defining step to define a second pointer indicating a first portion of the second image to be displayed in the window;

a copying step to copy the first portion of the first image from the second memory to the first memory at the first display addresses based on the first pointer;

a copying step to copy the first portion of the second image from the third memory to the first memory at the second display addresses based on the second pointer;

a displaying step to display the first portion of the first image and the first portion of the second image in the window of the third image;

an accepting step to accept user interface commands to scroll the first image, the second image, or both images, and changing a value of the first pointer, a value of the second pointer, or both values in response thereto, the changed value or values indicating a second portion of the first image to be displayed in the window, a second portion of the second image to be displayed in the window, or both; and a repeating step to repeat said copying step and said displaying step with respect to the portion or portions indicated by the changed value or values.

80. Computer executable process steps according to claim 79, wherein the first and second portions of the first and second images have a height of x pixels and a width of y pixels and wherein, in said accepting step, user interface commands to scroll the first image, the second image, or both images downward are accepted.

81. Computer executable process steps according to claim 80, wherein, in said accepting step, the value of the first pointer, the second pointer, or both pointers is decreased by y.

82. Computer executable process steps according to claim 80, wherein, in said accepting step, the value of the first pointer, the second pointer, or both pointers is decreased by an integer multiple of y.

83. Computer executable process steps according to claim 80, wherein, in said accepting step, the value of the first pointer, the second pointer, or both pointers is increased by y.

84. Computer executable process steps according to claim 80, wherein, in said accepting step, the value of the first pointer, the second pointer, or both pointers is increased by an integer multiple of y.

85. Computer executable process steps according to claim 79, wherein the first and second portions of the first and second images have a height of x pixels and a width of y pixels and wherein, in said accepting step, user interface commands to scroll the first image, the second image, or both images upward are accepted.

86. Computer executable process steps according to claim 79, wherein the first image and the second image are stored horizontally, and wherein, in said accepting step, user interface commands to scroll the first image, the second image, or both images rightward are accepted.

87. Computer executable process steps to claim 86, wherein, in said accepting step, the value of the first pointer, the second pointer, or both pointers is increased by one.

88. Computer executable process steps according to claim 86, wherein, in said accepting step, the value of the first pointer, the second pointer, or both pointers is increased by an integer.

89. Computer executable process steps according to claim 79, wherein the first image and the second image are stored horizontally, and wherein, in said accepting step, user interface commands to scroll the first image, the second image, or both images leftward are accepted.

90. Computer executable process steps according to claim 89, wherein, in said accepting step, the value of the first pointer, the second pointer, or both pointers is decreased by one.

91. Computer executable process steps according to claim 89, wherein, in said accepting step, the value of the first pointer, the second pointer, or both pointers is decreased by an integer.

92. Computer executable process steps stored on a computer-readable medium, the process steps to scroll a first image inside a window of a second image displayed on a display screen, the steps comprising:

a storing step to store the second image in a first memory used for displaying images on the display screen;

a designating step to designate display addresses in the first memory corresponding to a location of the window on the display screen;

a storing step to store the first image in a second memory different from the first memory;

a defining step to define a pointer indicating a first portion of the first image to be displayed in the window;

a copying step to copy the first portion of the first image from the second memory to the first memory at the display addresses based on the pointer;

a displaying step to display the first portion of the first image in the window of the second image;

an accepting step to accept user interface commands to scroll the first image, and to change a value of the pointer in response thereto, the changed value indicating a second portion of the first image to be displayed in the window; and a repeating step to repeat said copying step and said displaying step with respect to the second portion.

93. Computer executable process steps according to claim 92, wherein, in said designating step, first display addresses and second display addresses in the first memory corresponding to a location of the window on the display screen are designated, wherein, in said storing step, the first image and a third image are stored in the second memory, wherein, in said defining step, a first pointer indicating a first portion of the first image to be displayed in the window and a second pointer indicating a first portion of the third image to be displayed in the window are defined, wherein, in said copying step, the first portion of the first image is copied from the second memory to the first memory at the first display addresses based on the first pointer and the first portion of the third image is copied from the second memory to the first memory at the second display addresses based on the second pointer, wherein, in said displaying step, the first portion of the first image and the first portion of the third image are displayed in the window of the second image, and wherein, in said accepting step, user interface commands to scroll the first image, the third image, or both are accepted and a value of the first pointer, a value of the second pointer, or both is changed in response thereto.

* * * * *

UNITED STATES PATENT AND TRADEMARK OFFICE
CERTIFICATE OF CORRECTION

PATENT NO.   : 6,067,068
DATED        : May 23, 2000
INVENTOR(S)  : Arshad Hussain Page 1 of 1

It is certified that error appears in the above-identified patent and that said Letters Patent is hereby corrected as shown below:

<u>Column 3,</u>
Line 5, "shown" should read -- shown in --.

<u>Column 8,</u>
Line 51, "Computer-executable" should read -- Computer executable --.
Line 54, "Computer-executable" should read -- Computer executable --.

Signed and Sealed this

Twenty-fifth Day of September, 2001

Attest:

*Nicholas P. Godici*

NICHOLAS P. GODICI
*Attesting Officer*     *Acting Director of the United States Patent and Trademark Office*